United States Patent [19]

Wilds

[11] Patent Number: 4,821,454
[45] Date of Patent: Apr. 18, 1989

[54] FLORAL ARRANGEMENT CONTAINER FOR UMBRELLA TABLE

[76] Inventor: Brian E. Wilds, 13502 - 37th Ave. S., Seattle, Wash. 98168

[21] Appl. No.: 117,477

[22] Filed: Nov. 5, 1987

Related U.S. Application Data

[63] Continuation-in-part of Ser. No. 902,747, Sep. 2, 1986, abandoned.

[51] Int. Cl.[4] .............................................. A01G 5/00
[52] U.S. Cl. ...................................... 47/41 R; 47/71; 47/66
[58] Field of Search ................ 47/41 R, 67, 71, 66; 220/18, 23.86, 69

[56] References Cited

U.S. PATENT DOCUMENTS

| | | | |
|---|---|---|---|
| 278,521 | 4/1985 | Baird et al. | D11/153 |
| 585,486 | 6/1897 | Snow | 47/41 |
| 986,395 | 3/1911 | King | 47/33 |
| 1,381,071 | 6/1921 | Flannery | 215/12.1 |
| 1,381,577 | 8/1920 | Flannery | 47/41 |
| 1,391,353 | 9/1921 | Wells | 47/71 |
| 1,661,361 | 3/1928 | Cooley | 47/41 R |
| 3,529,742 | 9/1970 | Cumming | 220/69 |
| 3,541,727 | 11/1970 | Carlson | 47/41 |
| 3,565,281 | 2/1971 | Collie | 220/69 |
| 3,661,350 | 5/1972 | Eckler et al. | 248/146 |
| 3,879,889 | 4/1975 | Schmid | 47/39 |
| 4,227,343 | 10/1980 | Epsy et al. | 47/39 |
| 4,369,216 | 1/1983 | Willinger | 428/17 |
| 4,402,081 | 7/1978 | Morrow | 47/67 |
| 4,509,289 | 4/1985 | Fogelson | 47/70 |
| 4,597,221 | 7/1986 | Adair et al. | 47/66 |

FOREIGN PATENT DOCUMENTS 166067  11/1955  Australia ............................. 220/18

Primary Examiner—Robert A. Hafer
Assistant Examiner—Sam Rimell
Attorney, Agent, or Firm—Delbert J. Barnard

[57] ABSTRACT

A container includes inner wall means defining a vertically elongated center tube which includes an inner pole space in which an umbrella pole is received. The container includes outer wall means which surrounds the inner wall means. The inner and outer wall means define a space in which a floral arrangement is received. A lock button receiving channel may be formed along one side of the center tube. In use, a lock button which projects laterally outwardly from the pole extends into the channel.

13 Claims, 2 Drawing Sheets

U.S. Patent    Apr. 18, 1989    Sheet 1 of 2    4,821,454
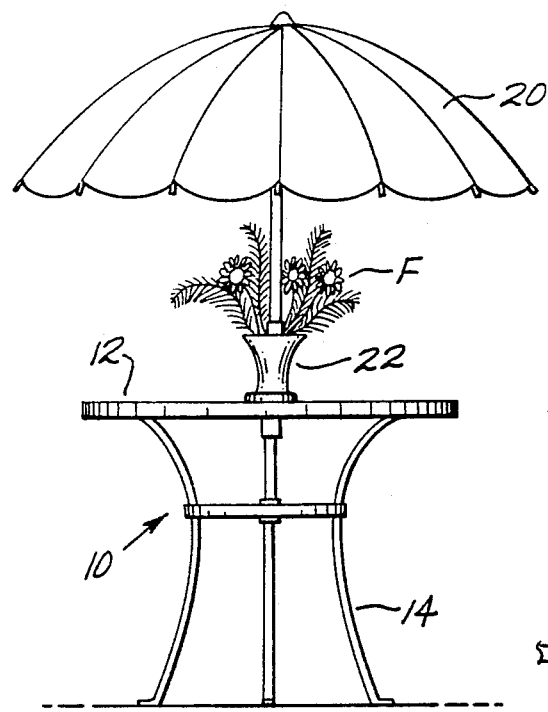
Fig. 1
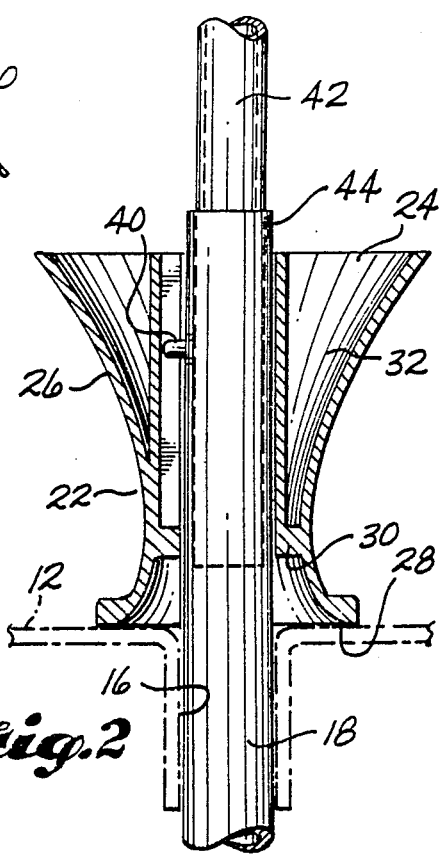
Fig. 2
Fig. 4
Fig. 3
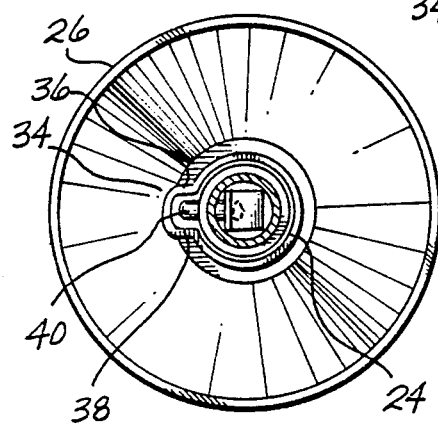
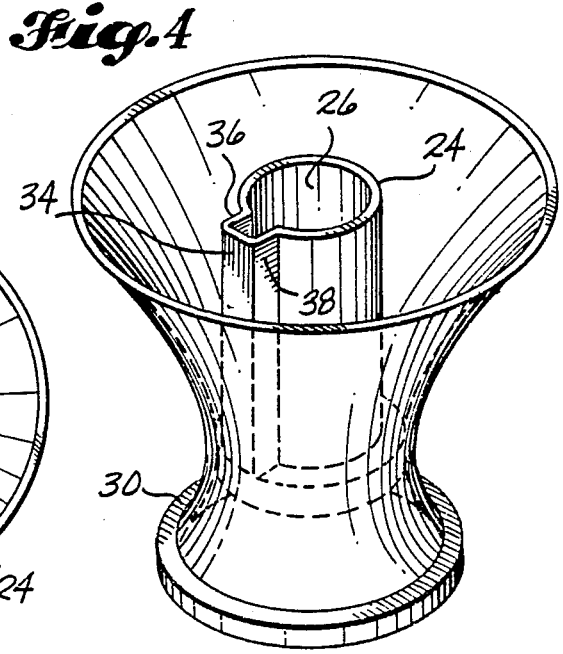

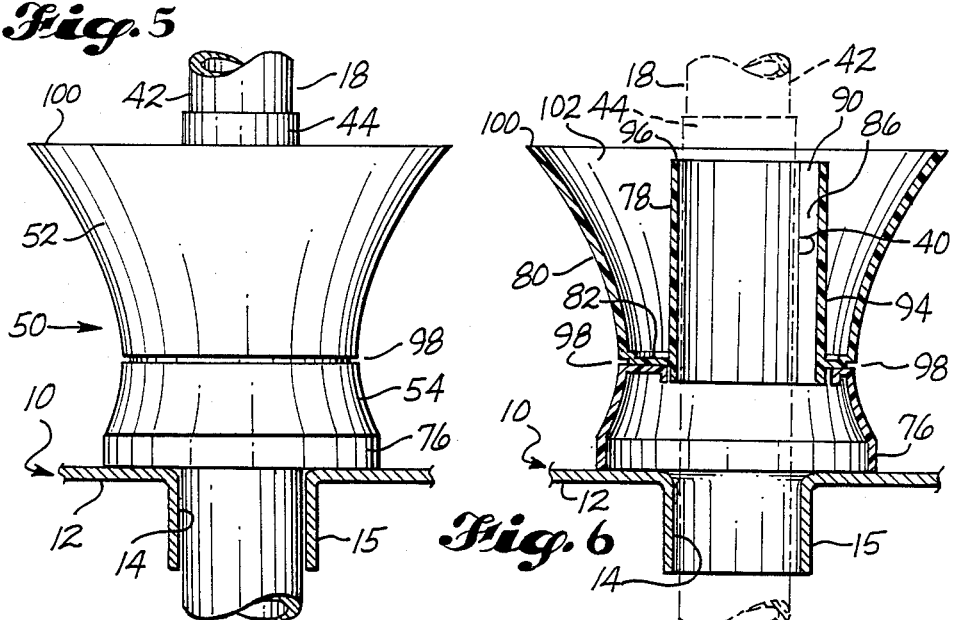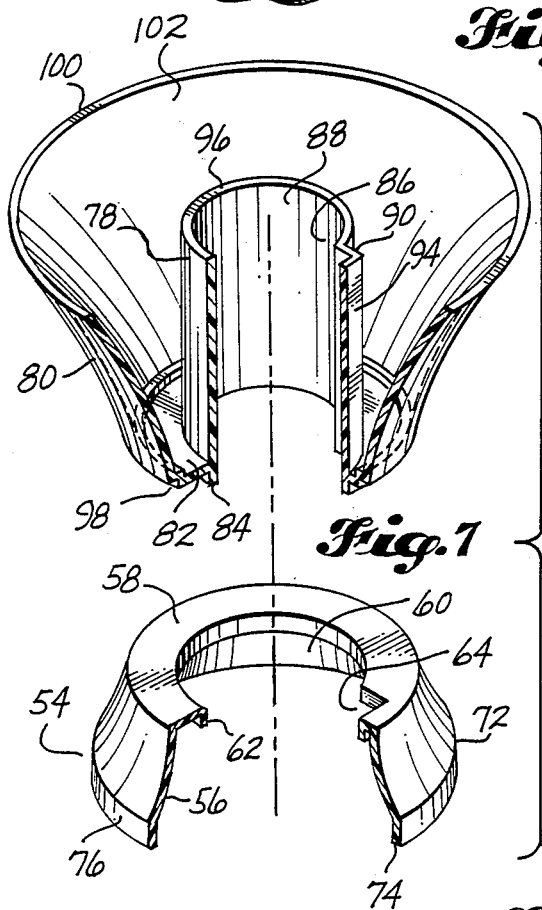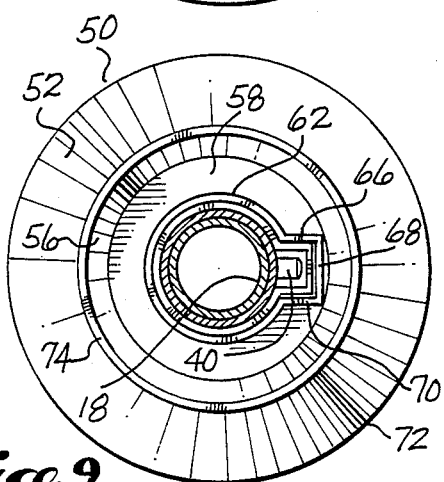

FLORAL ARRANGEMENT CONTAINER FOR UMBRELLA TABLE

RELATED APPLICATION

This is a continuation-in-part of my copending application Ser. No. 902,747, filed Sept. 2, 1986, now abandoned, and entitled Floral Arrangement Container for Umbrella Table.

Technical Field

This invention relates to floral arrangement containers. More particularly, it relates to a floral arrangement container for use at the center of a table of a type which is equipped with an umbrella having a pole extending through a center opening in the table.

BACKGROUND ART

There are tables which are used outdoors and which come equipped with an umbrella. The umbrella extends over the top of the table and provides shade for people sitting about the table. The umbrella includes a center pole which extends through a center opening in the table and a push button projecting laterally of the pole at a location spaced a small distance above the table.

U.S. Pat. No. 4,597,221, granted July 1, 1986 to Brenda A. Adair and Kent A. Stevens disclosed a type of floral container for the center of an umbrella table which can only be used with an umbrella having a plain pole.

There is a need for a floral arrangement container which can be used with an umbrella pole which has a push bottom. It is a principal object of the present invention to provide such a floral container. A patent search was conducted and it failed to disclose the container of the present invention. The patents developed by the search are all United States patents and they are as follows: U.S. Pat. Nos. 986,395, granted Mar. 7, 1911 to Gertrude M. King; 3,661,350, granted May 9, 1972, to Richard C. Eckler and Frank H. Amirault; 4,369,216, granted Jan. 18, 1983, to Allan H. Willinger; 4,509,289, granted Apr. 9, 1985, to Seymour Fogelson; and Des. No. 278,521, granted Apr. 23, 1985, to Robert W. Baird and Patricia Hopper.

DISCLOSURE OF THE INVENTION

In accordance with the present invention, a container is provided which includes inner wall means defining a tubular center section. The tubular center section includes an inner space sized to receive the support pole for an umbrella. The container also includes outer wall means surrounding the inner wall means and defining therewith a floral arrangement receiving space. The outer wall means includes a supporting bottom. The container extends upwardly from the bottom and includes an open top spaced from the bottom.

In accordance with an aspect of the invention, the inner wall means also defines a vertically elongated channel on one side of the pole space, opening into the pole space. The channel receives and accommodates a push button which may extend laterally outwardly from a pole positioned in the pole space.

In preferred form, the container is constructed to include a web that is spaced above the bottom of the container. The web has an outer periphery connected to the outer wall of the container. The lower end of the tubular inner wall is connected to the web.

The container can be molded as one piece or can be built into two sections which are then connected together.

Other more detailed features of the invention are described below as a part of the description of the best mode of the invention.

BRIEF DESCRIPTION OF THE DRAWING

In the drawing, like reference numerals are used to designate like part throughout the several figures of the drawing, and:

FIG. 1 is a side elevational view of an umbrella table equipped with a centerpiece container for a floral arrangement, constructed in accordance with the present invention;

FIG. 2 is an enlarged scale view in the vicinity of the container, showing the umbrella pole in elevation, and the container in vertical section, and including a broken line showing of the center portion of the table;

FIG. 3 is a top plan view looking down into FIG. 2, showing the umbrella pole in section;

FIG. 4 is an isometric view of the container, taken from above;

FIG. 5 is a side elevational view of a center portion of an umbrella table equipped with a second embodiment of a centerpiece container for a floral arrangement or the like, constructed in accordance with the present invention, shown surrounding a portion of the umbrella pole, with the table portion shown in section;

FIG. 6 is a view like FIG. 5, but showing the centerpiece container in vertical section, and showing the umbrella pole in phantom line;

FIG. 7 is an exploded pictorial view of the centerpiece container, with foreground quarter sections of the two parts removed for purposes of better illustrating the construction of the two parts of the container;

FIG. 8 is a sectional view taken substantially along line 8—8 of FIG. 5, showing the centerpiece container in top plan; and FIG. 9 is a sectional view taken substantially along line 9—9 of FIG. 5, showing the centerpiece container and bottom plan.

BEST MODE FOR CARRYING OUT THE INVENTION

FIG. 1 shows a table 10 having a top 12 and support legs 14. An opening 16 (FIG. 2) is provided in the center of the top 12. The opening 16 is sized to receive the pole 18 of an umbrella 20.

A floral container 22, embodying the invention, is shown positioned at the center of the table 12. Container 22 includes inner wall means 24 defining a tubular center section having a pole space 33 sized to receive the pole 18.

The container 22 also includes outer wall means 26 having a support bottom 28 which may rest on the table top 12, either directly or indirectly. A transverse web 30 is located above the support bottom 28. The container 22 has a relatively narrow diameter in the vicinity of the web 30. Container 22 has a diameter above the web 30 which is subtantially larger than the diameter at the web 30. It also has a diameter below the web which is larger than the diameter at the web 30.

In the illustrated embodiment, the outer wall means 26 flares out as it extends upwardly from the web 30. The lower end of the tubular center section 24 is connected to the web 30. A cylindrical outer wall surface 31 may be formed at the base of the container to serve as a place to locate advertising indicia, or some other indicia.

A space 32 is defined by and between the outer wall means 26 and the inner wall means 24. As shown by FIG. 1, a floral arrangement is positioned within this space 32.

As clearly shown by FIGS. 2-4, the inner wall means 24 may also define an elongated channel 24 which has a substantially U-shaped cross section and opens inwardly, into the pole space 33. Channel 34 has parallel sidewalls 36, 38 and an end wall 41, connected by right angle corners to the sidewalls 36, 38. The channel 34 extends upwardly from the web 30.

As shown by FIGS. 2 and 3, the purpose of the channel 34 is to receive and accommodate a button 40 which projects laterally outwardly from the pole 18. More specifically, the pole 18 comprises upper and lower sections 42, 44 which are telescopically connected together. The button 40 extends through aligned openings in the two pole sections 42, 44, and connects them together. As is well-known per se, when the button 40 is depressed, the sections 42, 44 can be moved either together or apart.

The channel 34 both provides a space in which the button 40 may project and can serve as a guideway for a suitable tool, e.g. a screwdriver, which may be inserted downwardly into the channel 34, and used to depress the button 40 while the container 22 is positioned about the pole 18.

The container 22 may include a lower flared portion which extends downwardly below the web 30, in the manner illustrated. Of course, the exterior configuration and overall shape of the container 22 can vary substantially from what is illustrated, without departing from the present invention.

The container 22 may be constructed from a suitable plastic material. For example, it may be injection molded. The web 30 provides a central connection point for the lower portion of the outer wall 26, for the upper portion of the outer wall 26, and for the inner wall 24 and the channel 34. The presence of the web 30 makes it possible to make the walls relatively thin and still end up with a container 22 that is relatively strong and rigid.

As should be evident, the container 22 may be slid onto the pole 18 prior to the pole 18 being inserted into the table top opening 16. The pole 18 is allowed to move downwardly until its lower end contacts a supporting surface. Or, the container 22 can be set onto the table, with the pole space 33 in alignment with the opening 16. Then, the pole 18 can be positioned above the upper end of pole space 33 and then lowered through first the pole space 33 and then the table top opening 16, with the lowering continuing until the bottom of the pole 18 contacts the support surface.

Preferably, the container 22 is provided with a decorative appearance. This may be done in a number of ways. It may involve a choice of color, texture, surface design and overall container shape.

FIG. 5 shows a fragmentary center portion of an umbrella table 10 having a top 12 and a center opening 14 formed by a downwardly extending flange 15. The opening 14 is sized to receive the pole 18 of an umbrella 20.

A floral container 50, embodying the invention, is shown positioned at the center of the table 10. The container 50 includes an upper part 52 and a lower part 54. The lower part 54 sets down on the table top 12 and the upper part 52 sets down on the lower part 54.

As best shown by FIGS. 6 and 7, the lower part 54 has a sidewall 56 and a top wall 58. The top wall 58 includes a central opening 60 which is bordered by a downwardly extending lip 62. A rectangular slot 64 is formed in wall 58. Slot 64 is closed at its outer end and at its inner end opens into the opening 60. As a result, slot 64 has two sides and an end. Each side makes a substantially square corner with the end. As best shown by FIG. 9, the lip 62 extends along the sides and end of the slot 64. On one side of the slot 64 the lip 62 is designated 66. At the end of the slot 64 it is designated 68. At the second side of the slot 64 it is designated 70.

Sidewall 56 widens as it extends down from the top 58 to circle 72. As it extends downwardly from circle 72 to a bottom edge 74 it may widen by a small amount. An outer surface 76 which is at least close to being cylindrical encircles the bottom portion of the bottom part 54. Advertising indicia may be placed on this surface 76.

Top part 52 comprises a tubular inner wall 78, an outer wall 80, a bottom wall 82, and a bottom lip 84. The inner wall 78 is formed to include an elongated channel 86 which has a substantially U-shaped cross section and opens inwardly, into a pole receiving space 88. As best shown by FIG. 8, the channel 86 may be defined by sidewalls 90, 92 and an end wall 94. The inner wall 78 is circular in cross section except at the region of the channel 86. The sidewalls 90, 92 of the channel 86 may make right angle corners with channel end wall 94. The lip 84 is in the nature of a downward continuation of the inner wall 78. It may include downward continuations of the side and end walls 90, 92, 94 of the channel 86.

The inner wall 78, including the lip 84, may taper as it extends upwardly from the lip 84 to a top edge 96. The channel 86 may also taper slightly as it extends from its portion in the lip 84 up to its portion at the upper edge 96 of wall 78.

A bottom wall 82 extends between and interconnects a lower portion of the inner wall 78 and a bottom of the outer wall 80. As shown by FIGS. 6 and 7, a jog may be formed where the outer portion of the bottom wall 82 is joined to the bottom of the sidewall 80. This produces a visible recess 98 which extends around the container 50 where the upper part 52 meets the lower part 54.

The downwardly extending lip 84 of the inner wall 78 extends into the top opening 60 in the top wall 58 of the bottom part 54. The downwardly extending lip portion of the channel 86 fits into the recess 64 formed in top wall 58.

As clearly shown by FIGS. 5-7, the sidewall 80 flares outwardly as it extends upwardly from the bottom wall 82 to a top edge 100.

The connection of bottom wall 82 to inner wall 78 and outer wall 80 of the upper part 52 is a one-piece connection and is water tight. The inner wall 82 extends upwardly within the outer wall 80 a distance substantially equal to the height of the outer wall 80. In this manner a chamber 102 is defined by and between the inner and outer walls 78, 80 into which a floral display or other object may be placed. If a floral display is used, and it is of a type which has to be watered, the chamber 102 will hold water.

The lips 84, 90, 92, 94 may make a tight interfit into the opening 60, 64. The upper and lower parts 52, 54 may be glued together at the walls 82, 58, and/or at the lips 84, 90, 92, 94 and 62, 66, 68, 70. Also, the two sets of lips 84, 90, 92, 94 and 62, 66, 68, 70 may be constructed to include snap together elements for use in connecting the top part 52 to the lower part 54.

As best shown by FIG. 6, the purpose of the channel 86 is to receive and accommodate a button 40 which projects laterally outwardly from the umbrella pole 18. The pole 18 may comprise upper and lower sections 42, 44 which are telescopically connected together. The button 40 extends through aligned openings in the two pole sections and connects them together, in a manner that is well-known per se. When the button 40 is depressed, the sections 42, 44 can be moved either together or apart.

The channel 86 provides a space in which the button 40 may project and can also serve as a guideway for a suitable tool, e.g. a screw driver tip, which may be inserted downwardly into the channel 86, and used to depress the button 40 while the container 50 is positioned about the pole 18.

The two parts 52, 54 of the container 50 may be constructed from a suitable plastic material. For example, the parts may be injection molded. The lips 84, 90, 92, 94 of top part 54 and the lips 62, 66, 68, 70 of the lower part 54 both serve as a convenient way of properly positioning the two parts 52, 54 together, and as strengthening for the walls 82 and 58, respectively. The jog formed where the outer boundary of the wall 82 meets and is joined to the lower edge of the sidewall 80 also functions to strengthen the upper part 52. The upper and lower parts 52, 54 are further strengthened by the flaring of the walls 54, 80. In addition, this flaring gives the walls a pleasant appearance.

The connection of the inner wall 78 to the bottom wall 82 is very important. It results in the bottom of chamber 102 being closed so that water can be placed in it without any of the water leaking out of chamber 102. Preferably, the outer diameter of the uppermost portion of sidewall 56 is substantially equal to the outer diameter of the lowermost portion of sidewall 80. The vertical curvature of the container 50, starting at ring 72, may be continuous as it extends upwardly first through sidewall 56 of bottom part 54 and then through sidewall 80 of upper part 52.

The presence of the lips 84, 90, 92, 94 and their interfit into the opening 60, 64, reinforced by the lips 62, 66, 68, 70 can cause a transfer of stresses from a leaning pole 18 acting against inner wall 78 to the lower member 54 and from the lower member 54 to the table top 12. When the two parts 52, 54 are together, the two walls 82, 98 function as a web which connects inner wall 78 to outer walls 54, 80. When the two parts are glued together, the construction of the container 50 is equivalent to a one-piece construction.

The illustrated embodiments merely serve as examples of the invention. The coverage is to be determined not by the examples, but by the claims which follow, interpreted in accordance with established rules of patent claim interpretation, including use of the doctrine of equivalents.

What is claimed is:

1. For use with a table having a central opening and an umbrella pole extending through said opening and vertically upwardly from the table, a centerpiece container, comprising:
    inner wall means defining a vertically elongated, tubular center section having a circular pole space sized to receive said pole;
    outer wall means surrounding said inner wall means and defining therewith a receiving space radially between said inner wall means and said outer wall means for a floral arrangement or other object;
    said outer wall means including a supporting bottom which in use makes supporting contact with a table;
    said container extending upwardly from said supporting bottom and having an open top spaced from said supporting bottom; and
    said inner wall means defining a vertically elongated channel on one side of said pole space, said channel opening laterally into said pole space throughout its full length, for receiving and accommodating a push button which may extend laterally outwardly from a pole positioned in said pole space, said channel having an open upper end through which a push button on a pole may move into and move out from the channel by axial movement of the pole into and out from the pole space.

2. A container according to claim 1, comprising an annular web spaced above the bottom of the container, said web having an outer periphery connected to the outer wall of the container, with the lower ends of the tubular inner wall and the channel being connected to said web, with the tubular center section having a bottom opening at the level of the web, with said outer wall widening in diameter as it extends upwardly from said web, with said outer wall also widening in diameter as it extends downwardly from the web, and with said tubular center section and said channel extending vertically upwardly from said web.

3. A container according to claim 2, wherein the web is integral in one piece with both the inner wall means and the outer wall means.

4. For use with a table having a central opening and an umbrella pole extending through said opening vertically upwardly from the table, a centerpiece container, comprising:
    a lower section having a sidewall and a top wall and an opening formed in the top wall;
    an upper section comprising inner wall means defining a vertically elongated, tubular center portion having a circular pole space sized to receive said pole, said circular pole space having open upper and lower ends, said inner wall means defining a vertically elongated channel on one side of said pole space, said channel opening laterally into said pole space throughout its entire length and having an open upper end, said channel being provided for receiving and accommodating a push button which may extend laterally outwardly from a pole positioned in the pole space and said open upper end of said channel permitting movement of a push button through said opening longitudinally into and out from the channel, outer wall means surrounding said inner wall means and defining therewith a receiving space radially between the two wall means for a floral arrangement or other object, an annular bottom wall extending between and interconnecting lower ends of the inner wall means and the outer wall means, said inner wall means having a downwardly projecting portion which extends into the opening in the top wall of the bottom section, for positioning the upper section with respect to the bottom section.

5. A container according to claim 4, wherein the bottom section increases in diameter as it extends downwardly from the top wall and the upper section increases in diameter as it extends upwardly from the annular wall.

6. A container according to claim 4, wherein the top and bottom sections are connected together where they meet.

7. A container according to claim 4, wherein the upper and lower sections are connected together and the bottom wall of the upper section, the top wall of the lower section and the downwardly projecting portion of the upper section which extends into the opening in the top wall of the bottom section together form a strengthening web for the container which connects the bottom of the tubular center portion to the outer wall means of the upper section and the sidewall of the lower section.

8. A container according to claim 7, wherein the bottom section increases in diameter as it extends downwardly from the top wall and the upper section increases in diameter as it extends upwardly from the annular wall.

9. For use with a table having a central opening and an umbrella pole extending through said opening vertically upwardly from the table, a centerpiece container, comprising:

a lower section having a sidewall and a tip wall and an opening formed in the top wall;

an upper section comprising inner wall means defining a vertically elongated, tubular center portion having a circular pole space sized to receive said pole, said inner wall means defining a vertically elongated channel on one side of said pole space, said channel opening laterally into said pole space throughout its entire length, said channel being provided for receiving and accommodating a push button which may extend laterally outwardly from a pole positioned in the pole space, outer wall means surrounding said inner wall means and defining therewith a receiving space for a floral arrangement or other object, an annular bottom wall extending between and interconnecting lower ends of the inner wall means having a downwardly projecting portion which extends into the opening in the top wall of the bottom section, for positioning the upper section with respect to the bottom section;

wherein the top and bottom sections are connected together where they meet;

wherein the opening in the top wall of the lower section is keyhole shaped, and wherein the downwardly projecting portion of the upper section comprise lip portions of the tubular center portion and the channel which project downwardly form the bottom wall of the upper section, have a key shape, and fit into the keyhole shaped opening in the top wall of the bottom section.

10. A container according to claim 9, wherein the bottom section increases in diameter as it extends downwardly from the top wall and the upper section increases in diameter as it extends upwardly from the annular wall.

11. A container according to claim 9, wherein said bottom section has a cylindrical outer wall surface at a lower end of the container to serve as a place to locate indicia.

12. A container according to claim 9, wherein the upper and lower sections are connected together and the bottom wall of the upper section, the top wall of the lower section and the downwardly projecting lip portion of the tubular center portion and the channel form a strengthening web for the container which connects the bottom of the tubular center portion and channel to the outer wall means of the upper section and the sidewall of the lower section.

13. A container according to claim 12, wherein the keyhole shaped opening in the top wall of the lower section is bordered by a downwardly projecting lip which strengthens the top wall of the lower section.

* * * * *